(12) United States Patent
Blaine et al.

(10) Patent No.: US 10,875,208 B1
(45) Date of Patent: Dec. 29, 2020

(54) PORTIONING STRIPS FROM A BLOCK WORK PRODUCT

(71) Applicant: John Bean Technologies Corporation, Chicago, IL (US)

(72) Inventors: George R. Blaine, Lake Stevens, WA (US); David A. Below, Port Clinton, OH (US)

(73) Assignee: John Bean Technologies Corporation, Chicago, IL (US)

( * ) Notice: Subject to any disclaimer, the term of this patent is extended or adjusted under 35 U.S.C. 154(b) by 478 days.

(21) Appl. No.: 15/006,973

(22) Filed: Jan. 26, 2016

Related U.S. Application Data

(60) Provisional application No. 62/107,924, filed on Jan. 26, 2015.

(51) Int. Cl.
 *B26F 3/00* (2006.01)
 *G05B 19/19* (2006.01)

(52) U.S. Cl.
 CPC ............ *B26F 3/004* (2013.01); *G05B 19/19* (2013.01); *G05B 2219/45036* (2013.01); *G05B 2219/4714* (2013.01)

(58) Field of Classification Search
 None
 See application file for complete search history.

(56) References Cited

U.S. PATENT DOCUMENTS

| | | | | |
|---|---|---|---|---|
| 4,387,111 A | * | 6/1983 | Mullender | A23G 3/50 426/512 |
| 4,704,688 A | * | 11/1987 | Kamata | G05B 19/4103 318/573 |
| 5,868,056 A | | 2/1999 | Pfarr et al. | |
| 2002/0164221 A1 | * | 11/2002 | Izutsu | G05B 19/4166 409/132 |
| 2003/0201260 A1 | * | 10/2003 | Steur | H05K 3/0032 219/121.71 |
| 2010/0191359 A1 | * | 7/2010 | Diehl | G05B 19/40937 700/97 |
| 2012/0059500 A1 | * | 3/2012 | Kim | B26D 3/10 700/98 |
| 2013/0150994 A1 | * | 6/2013 | Barbir | G05B 19/4099 700/98 |
| 2013/0340580 A1 | * | 12/2013 | Strong | B26D 5/007 83/13 |
| 2014/0220193 A1 | | 8/2014 | Hocker et al. | |

* cited by examiner

*Primary Examiner* — Erin F Heard
*Assistant Examiner* — Donald H B Braswell
(74) *Attorney, Agent, or Firm* — Christensen O'Connor Johnson Kindness PLLC

(57) ABSTRACT

Cutting system (10) includes a conveyor (12) for carrying work products (13) past a scanner (200) and then past one or more cutting systems (17). The cutting systems include one or more assembly/units/apparatus (19) arranged in an array or series for cutting continuous strip(s) from the work products (13). The cutting assemblies (19) are carried by a powered system to move the cutter assemblies in spiral, serpentine, back-and-forth or other patterns to cut one or more continuous strips from the work product. The conveyor (12), scanner (200), and cutter systems (17) are coupled to and controlled by a computer (220).

24 Claims, 8 Drawing Sheets

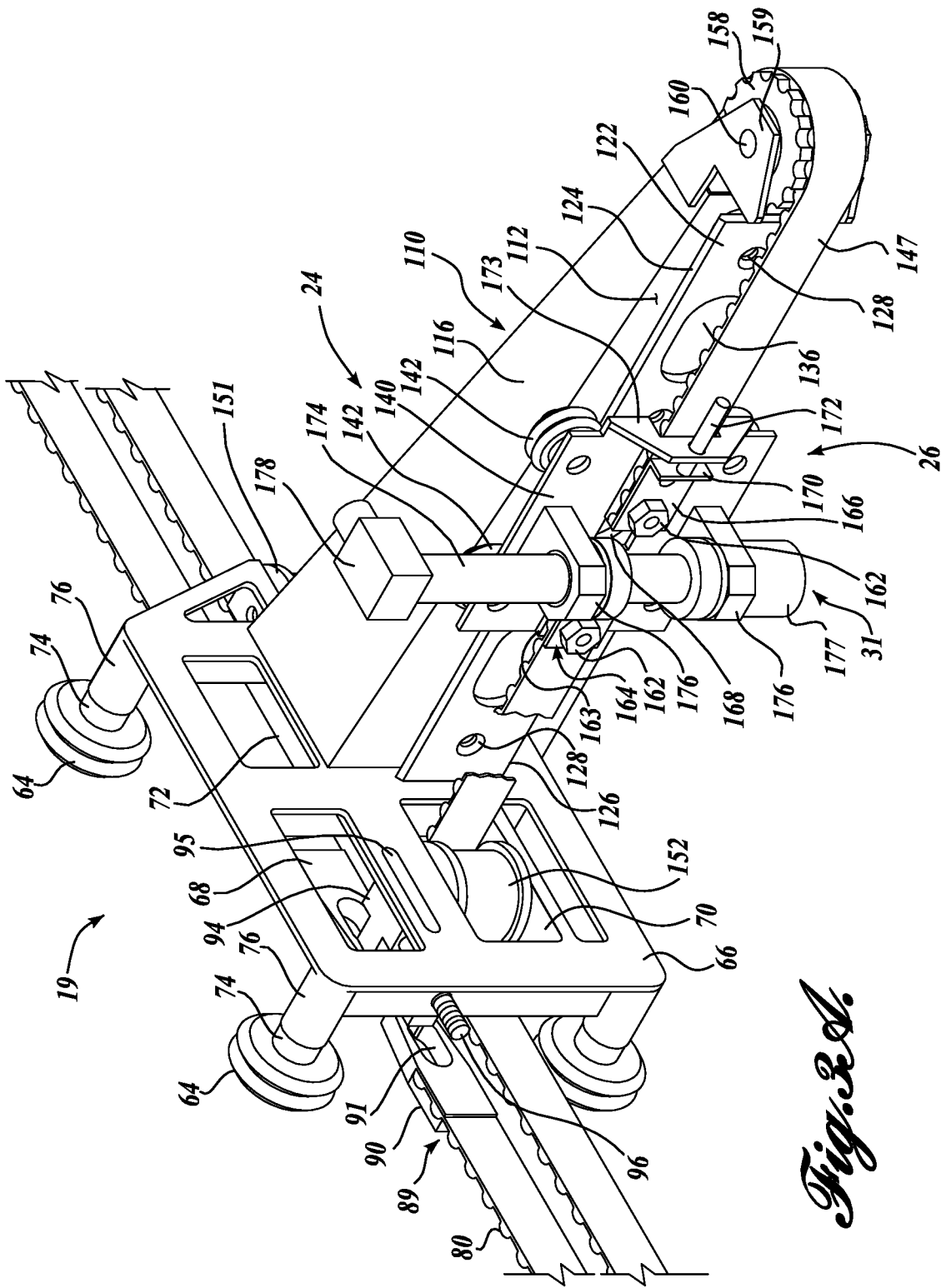

PORTIONING STRIPS FROM A BLOCK WORK PRODUCT

CROSS-REFERENCE TO RELATED APPLICATION

This application claims the benefit of U.S. Provisional Application No. 62/107,924, filed Jan. 26, 2015, the disclosure of which is hereby incorporated by reference herein in its entirety.

FIELD OF THE INVENTION

The present invention relates generally to systems and methods for slicing or portioning workpieces, and more particularly to systems and methods for cutting/slicing a continuous strip from a shorter workpiece utilizing a non-directional cutting device.

BACKGROUND OF THE INVENTION

Natural and manufactured food products, such as cured pork bellies, ham, and deli meats are often subsequently sliced or otherwise cut into portions suitable for consumption by individual people. A common example is bacon sliced from cured pork belly, then packaged as individual strips of appropriate length to put in a frying pan. In some instances, it would be advantageous to have much longer strips of sliced material, perhaps distributed as rolls that can be cut to required length at the point of use. This concept is used widely in non-food applications, in such products as paper towels and adhesive tape, which can be provided as individual portions, but for convenience are often offered as rolls. The present invention seeks to cut long strips of food from shorter food pieces using a high-pressure water jet or other non-directional cutting device.

A restaurant might use continuous rolls of bacon for efficiently wrapping the perimeter of filet mignon pieces, cutting to length according to the perimeter length of the individual fillets. A submarine sandwich shop could use continuous rolls of ham to lay ham down on sandwiches of various lengths. An individual consumer at home may keep a continuous roll of bacon in the refrigerator, pulling out the length s/he wants when s/he wants it for whatever need s/he has right then. The compact rolled shape saves space in the refrigerator and keeps the meat fresher with less exposed surface area. An industrial scale food processor may have very large rolls of any sort of product that is normally provided as slices, with special dispensing machines that mete out the exact amount needed for the product recipe. Extra long rolls can be fabricated from shorter strips, using various meat adhesives available on the market.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for cutting one or more elongated strips from a workpiece includes a conveyance system for conveying the workpiece, a scanner for scanning the workpiece to physically characterize the workpiece, a cutting system in the form of a line cutter for cutting the workpiece into one or more elongated strips, a carrier system for moving the line cutter relative to the conveyance system along one or more cutting paths to cut the workpiece into one or more elongated strips, and a computer processor-enabled control system to process the scanning information to determine the physical parameters of the workpiece and to direct the carrier system and cutting system to cut the workpiece along one or more cutting paths so as to cut the workpiece into one or more elongated strips of a length longer than the length or width of the workpiece.

The cutting system according to the present disclosure wherein the scanner is used to determine the size, shape and location of the workpiece on the conveyance system.

In a further aspect of the cutting system of the present disclosure, the control system determines a continuous cutting path for the line cutter and then controls the cutting system and carrier system to cut the workpiece along the determined continuous path, thereby to cut the workpiece into one or more continuous strips.

In a further aspect of the cutting system of the present disclosure, the pattern of the cutting path may be spiral pattern, a serpentine pattern, or a continuous back-and-forth pattern. In addition, the spiral cutting pattern may be round, square, rectangular, rectilinear, oval, or elliptical in shape or a combination of two or more of these shapes. Moreover, the shape of the spiral cutting path can correspond to the overall shape of the workpiece.

In a further aspect of the cutting system of the present disclosure, two or more line cutters can be operated in tandem to cut the workpiece along the multiple lead path. Further, the two or more line cutters can cut the portion into a continuous path under the control of the processor-enabled control system. In addition, the two or more line cutters can sequentially cut portions of the continuous cutting path.

In a further aspect of the cutting system of the present disclosure, the control system can control the line cutters to cut crosscuts in the edge of the strip cut from the workpiece, for example, to indicate a specific length or weight of the workpiece between incremental edge crosscuts.

In a further aspect of the cutting system of the present disclosure, the control system functions to determine the shape of the cutting pattern, determine how many patterns to cut from a workpiece, determines where to place the cutting patterns on the workpiece, adjusts the cutting pattern to compensate for defects in the workpiece and/or adjust the cutting pattern to compensate for variations in the thickness of the workpiece.

A method for cutting one or more elongated strips from a workpiece includes scanning the workpiece to determine physical parameters of the workpiece, including the size and shape of the workpiece, determining a cutting pattern for the workpiece to cut the workpiece into one or more continuous strips, and operating the line cutter to cut the workpiece in the pre-determined cutting pattern.

In a further aspect of the cutting method of the present disclosure, the workpiece is conveyed during scanning of the workpiece as well as during cutting of the workpiece into one or more continuous strips.

In a further aspect of the cutting method of the present disclosure, the pattern of a cutting path into which the workpiece is cut may be a spiral pattern, a serpentine pattern, or a continuous back-and-forth pattern. Further, the shape of the spiral cutting pattern can be round, square, rectangular, rectilinear, oval, elliptical, or a combination of two or more of these shapes. In addition, the shape of the spiral cutting pattern can correspond to the overall shape of the workpiece.

In a further aspect of the cutting method of the present disclosure, two or more line cutters can be operated in tandem to cut the workpiece along a multiple lead path. The two or more line cutters can sequentially cut a portion of the continuous cutting path.

In a further aspect of the cutting method of the present disclosure, sequential crosscuts can be made in the edge of the strip being cut from the workpiece, wherein such crosscuts can be made at an incremental fixed distance along the length of the cut strip or at incremental distances along the length of the cut strip based on the desired weight of the cut strip.

In a further aspect of the present disclosure, the present cutting method can include determining how many cutting patterns to cut from the workpiece, determining where to place the one or more cutting patterns on the workpiece, adjusting the cutting pattern to compensate for defects in the workpiece and/or adjusting the cutting pattern to compensate for variations in the thickness of the workpiece.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is an enlarged isometric view of a portion of FIG. 2;

DETAILED DESCRIPTION

Figure 1:
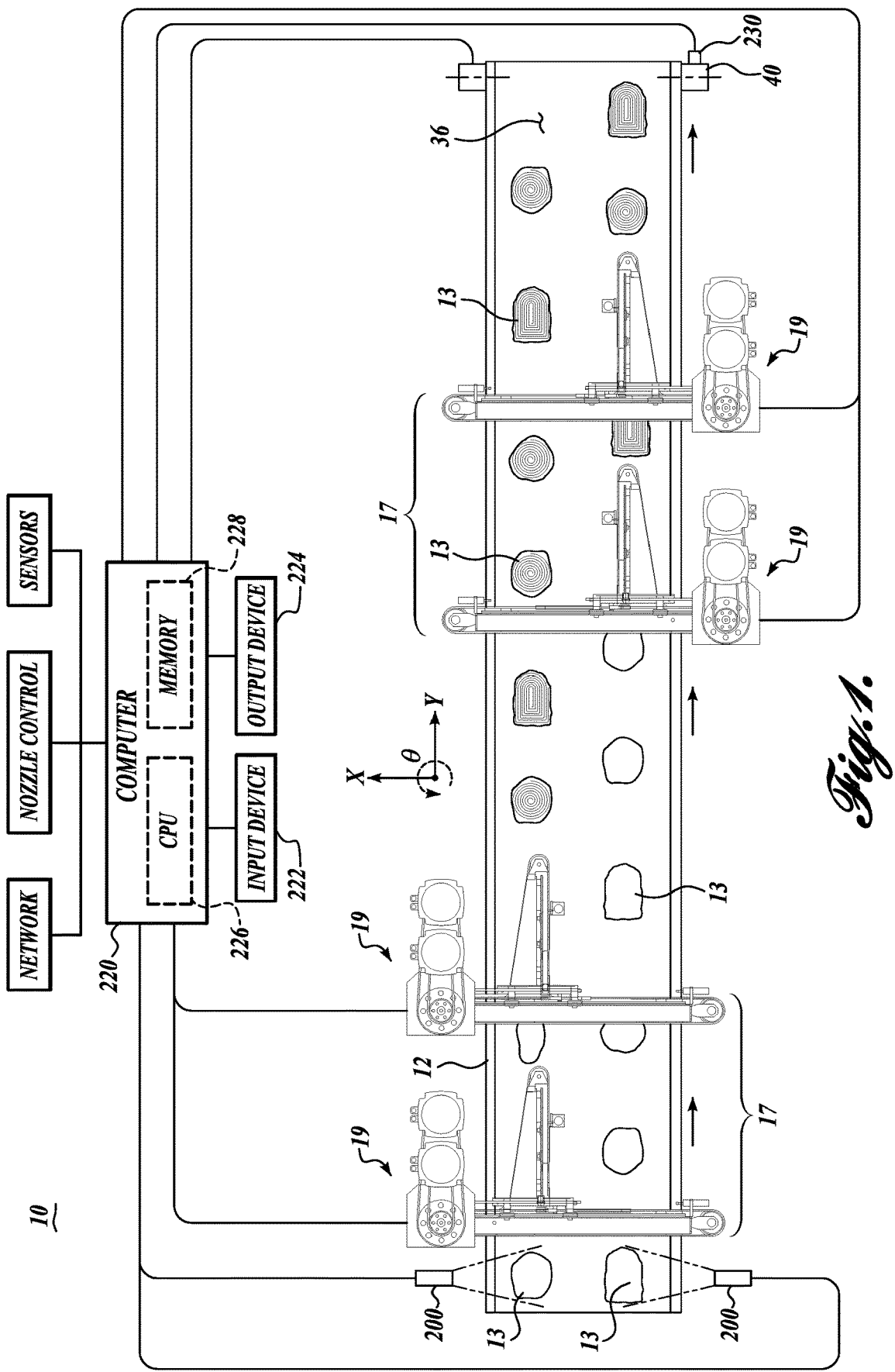
FIG. 1 is a top schematic view of a system for slicing a workpiece into a continuous strip in accordance with the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application includes references to directions, such as "forward," "rearward," "front," "back," "upward," "downward," "right hand," "left hand," "in," "out," "extended," "advanced," "retracted," "proximal," and "distal." These references and other similar references in the present application are only to assist in helping describe and understand the present invention and are not intended to limit the present invention to these directions. Also, references to "work product," "workpiece," "food product," "food piece," and "portion" are understood to be interchangeable and are not meant to be limiting in nature.

Also, with respect to the terminology used in the present application, for the most part, the word "parameter" is used to refer to a physical characteristic or feature such as length, width, thickness, weight or color. Also for the most part, the word "specification" refers to a particular parameter value or range, such as a length of between 110 and 120 mm, a weight that is no more than 30 grams, or the color blue. Also, in accordance with the present application, a specific instance of a parameter will have a value, and the value may or may not lie within a particular specification. In spite of the foregoing, it is within the scope of the present application to intermingle the use of the term "parameter" with the use of the term "specification." For example, if the word "specification" is being utilized, this word should be interpreted broadly enough to also encompass the word "parameter," and vice-versa. Also, in the present application, the word "characteristic" shall be a generic term that refers to "parameter" and/or "specification."

The present application may include modifiers, such as the words "generally," "approximately" or "substantially." These terms are meant to serve as modifiers to indicate that the "dimension," "shape," or other physical parameter or specification in question need not be exact, but may vary as long as the function that is required to be performed can be carried out. For example, in the phrase "generally circular in shape," the shape need not be exactly circular as long as the required function of the structure or process in question can be carried out. As another example, in the phrase "a substantially flat surface" the surface in question need not be exactly flat, but rather sufficiently flat that required function or requirement of the surface can be achieved.

In the following description, various embodiments of the present disclosure are described. In the following description and in the accompanying drawings, the corresponding systems assemblies, apparatus and units are identified by the same part number, but with an alpha suffix. The descriptions of the parts/components of such systems assemblies, apparatus and units that are the same or similar are not repeated so as to avoid redundancy in the present application.

General System and Method

FIG. 1 schematically illustrates a system 10 suitable for implementing an embodiment of the present disclosure. The system 10 includes a moving support surface in the form of a conveyor 12 for carrying work products 13 arranged in multiple lanes or windrows extending along the conveyor, to be portioned. The work products may be food products, such as meat, poultry, or fish that are spaced along the conveyor. Other types of work products may include items composed of, for example, fabric, rubber, cardboard, plastic, wood, or other types of material spaced along the conveyor.

The system 10 includes a scanner 200 for scanning the work products 13. The system 10 also includes cutter systems 17 composed of one or more cutter assemblies/units/apparatus 19, which may be arranged in an array or series of cutter assemblies, for cutting continuous strip(s) from the work products 13. The cutter assemblies 19 are carried by a powered carrier system to move the cutter assemblies in spiral, serpentine, back-and-forth, and other patterns to cut one or more continuous strips from the work product.

The conveyor 12, the scanner 200, and cutter systems 17, are coupled to, and controlled by, processor or computer 220. As illustrated in FIG. 1, the processor/computer includes an input device 222 (keyboard, mouse, etc.) and an output device 224 (monitor, printer, etc.). The computer 220 also includes CPU 226 and a memory 228.

Conveyance System

Figure 2:
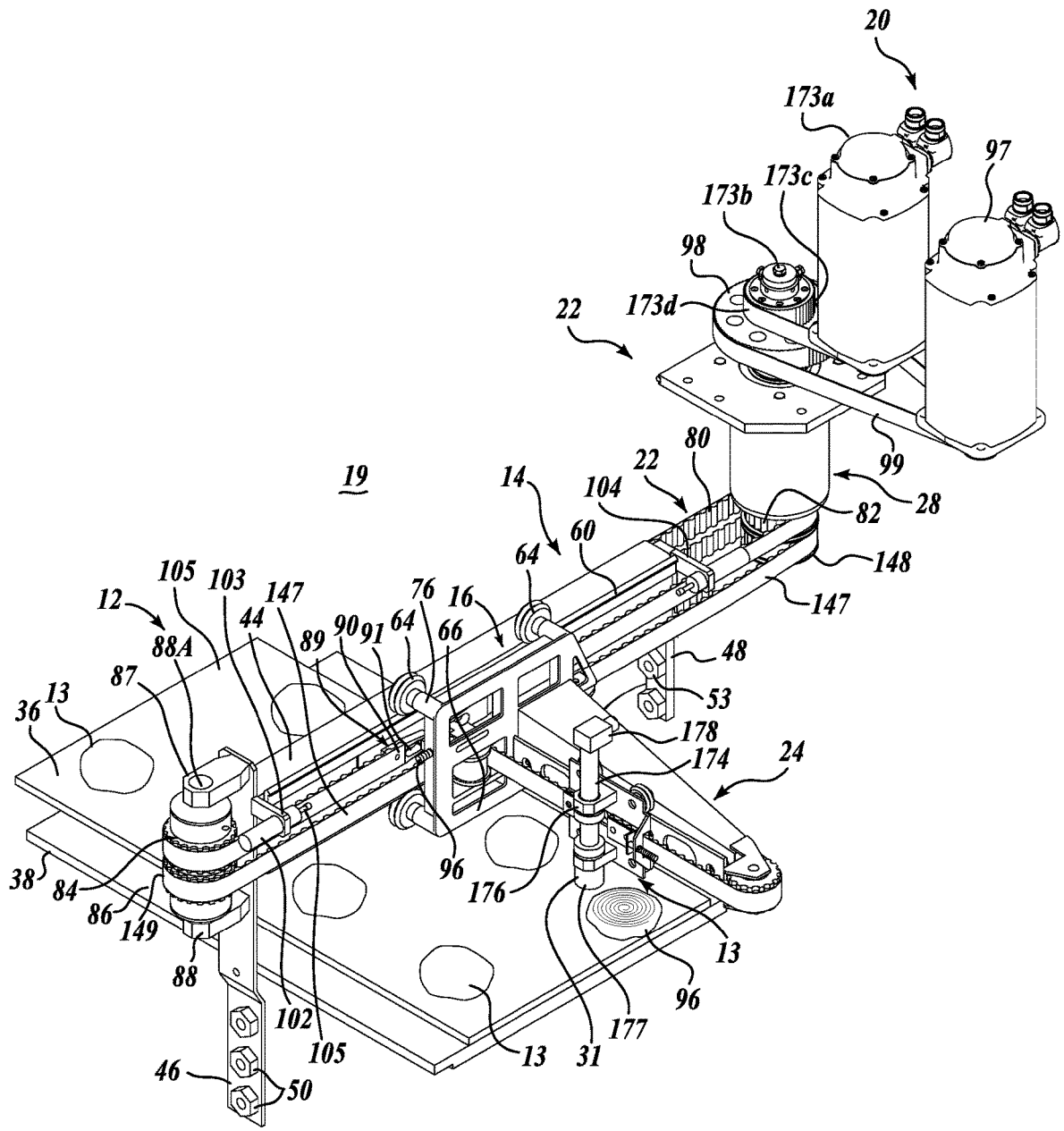
FIG. 2 is an isometric view of a nozzle-type slicer/cutting assembly that may be used in the portioning system of FIG. 1.

Referring specifically to FIGS. 1 and 2, the conveyance system 12 includes a moving belt 36 that slides over an underlying support or bed 38. The belt 36 is driven by drive rollers carried by a frame structure (not shown) in a standard manner. The drive rollers are in turn driven at a selected speed by a drive motor 40, also in a standard manner. The drive motor 40 can be composed of a variable speed motor to thus adjust the speed of the belt 36 as desired, as the work product 13 is carried past scanner 200 and cutter systems 17.

An encoder 230 is integrated into the conveyance system 12, for example, at drive motor 40, to generate electrical pulses at fixed distance intervals corresponding to the forward movement of the conveyor belt 36. This information is routed to processor/computer 220 so that the location(s) of the particular work product 13, or the strips cut from the work product, can be determined and monitored as the work product or cut strips travel along system 10. This information can be used to position cutters 19 or cutter assemblies 17.

Scanning

Generally, the scanner 200 scans the work products 13 to produce scanning information representative of the work products and forwards the scanning information to the processor/computer 220. The processor/computer, using a scanning program, analyzes the scanning data to develop a width, area, and/or volume distribution of the scanned work product, as well as the overall shape of the work product. The processor/computer may also develop a thickness profile of the scanned work product. The processor/computer 220 then can model the work product to determine how the work product might be cut or sliced into one or more continuous strips. In this regard, the processor/computer takes into consideration the shape of the work product to be sliced as well as other physical parameters of the work product, such as the presence of fat, bone, rind, or other undesirable features of the work product. The processor/computer 220, using the scanning program or the slicing program, determines how the work product may be sliced into one or more continuous strips. The processor/computer 220, using the slicing software, then functions as a controller to control the cutter assemblies 19 to slice the work product 13 into strips of desired thickness(es).

Describing the scanning system in more detail, the conveyor 12 carries the work products 13 beneath the scanning system 200. The scanning system may be of a variety of types, including a video camera (not shown) to view the work products 13 illuminated by one or more light sources. Light from the light source is extended across the moving conveyor belt 36 to define a sharp shadow or light stripe line, with the area forwardly of the transverse beam being dark. When no work product 13 is being carried by the infeed conveyor 12, the shadow line/light stripe forms a straight line across the conveyor belt. However, when the work products 13 pass across the shadow line/light stripe, the upper, irregular surface of the work product produces an irregular shadow line/light stripe as viewed by a video camera angled downwardly on the work product and the shadow line/light stripe. The video camera detects the displacement of the shadow line/light stripe from the position it would occupy if no work product were present on the conveyor belt. This displacement represents the thickness of the work product along the shadow line/light stripe. The length of the work product is determined by the distance of the belt travel that shadow line/light stripes are created by the work product. In this regard, an encoder 230 is integrated into the infeed conveyor 12, with the encoder generating pulses at fixed distance intervals corresponding to the forward movement of the conveyor.

In lieu of a video camera, the scanning station may instead utilize an x-ray apparatus (not shown) for determining the physical characteristics of the work product, including its shape, mass, and weight. X-rays may be passed through the object in the direction of an x-ray detector (not shown). Such x-rays are attenuated by the work product in proportion to the mass thereof. The x-ray detector is capable of measuring the intensity of the x-rays received thereby, after passing through the work product. This information is utilized to determine the overall shape and size of the work product 13, as well as the mass thereof. An example of such an x-ray scanning device is disclosed in U.S. Pat. No. 5,585,603, incorporated by reference herein. The foregoing scanning systems are known in the art and thus are not novel, per se. However, the use of these scanning systems, in conjunction with the other aspects of the described embodiments, is believed to be new.

The data and information measured/gathered by the scanning device(s) are transmitted to the processor/computer 220, which records the location of the work products 13 on the conveyor 12, as well as the lengths, widths, and thicknesses of the work products about the entire work products. With this information, the processor, operating under the scanning system software, can develop an area profile, the overall shape, as well as a volume profile of the work products. Knowing the density of the work products, the processor can also determine the weight of the work products, or segments or sections thereof.

Although the foregoing description discusses scanning by use of a video camera and light source, as well as by use of x-rays, other three-dimensional scanning techniques may be utilized. For example, such additional techniques may be by ultrasound or moiré fringe methods. In addition, electromagnetic imaging techniques may be employed. Thus, the present invention is not limited to the use of video or x-ray methods, but encompasses other three-dimensional scanning technologies.

Carrier System

As shown in FIGS. 2 and 3A, cutter apparatus 19 in basic form includes a support structure 14 extending across the conveyor 12 for supporting and guiding a carriage 16 for movement transversely to the direction of movement of the conveyor. The carriage 16 is powered by a drive system including, in part, the motive system 20 and the drive train 22. A second, longitudinal support structure or beam 24 is cantilevered outwardly from carriage 16 in a direction generally aligned with the direction of movement of the conveyor 12. A second longitudinal carriage 26 is adapted to move along the beam 24 by a drive system, which in part includes the second motive system 28 to power the longitudinal carriage 26 through the drive train 22. A work tool 31, which may be in the form of a high-pressure water jet nozzle, is mounted on the carriage 26 to move longitudinally of the conveyor 12 as the work tool is operated on the underlying work product 13 being carried by the conveyor 12. The coordinated motion of the carriages 16 and 26 move the work tool 31 in desired spiral, staggered, back and forth, serpentine, and other paths to cut/slice the work product 13 into one or more continuous strips.

The transverse support structure 14 is composed of a gantry 44 that spans transversely across the conveyor 12 at an elevation spaced above belt 36. Ideally, the gantry 44 is composed of a hollow, rectangular construction, but may be formed in other manners and shapes without departing from the spirit or scope of the present invention. The ends of gantry 44 are supported by elongated upright brackets 46 and 48. As shown in FIG. 2, bracket 46 is fixed to the adjacent end of the gantry 44 to extend downwardly for mounting to conveyor 12. A plurality of hardware members 50 extend through clearance holes (not shown) formed in the lower, offset portion of bracket 46 to attach the bracket to the conveyor. Bracket 48 extends downwardly from the opposite end of gantry 44 for attachment to the conveyor 12. In this regard, hardware members 53 extend through clearance holes provided in the lower end of bracket 48 to attach the bracket to the conveyor. In this manner, the gantry 44 is mounted securely and stationarily on the conveyor.

Support structure 14 also includes a track for guiding carriage 16 along gantry 44, composed of an upper rail 60 and a lower rail 62 attached to the face of gantry 44 facing the carriage. The upper rail 60 extends along the upper corner of gantry 44, whereas the lower rail 62 extends along the lower corner of the beam. As also illustrated, the upper surface of the upper track 60 and the lower surface of the lower track 62 are crowned to engage with the concave outer perimeters of rollers 64 of carriage 16. As such, the carriage 16 is held captive on the track while traveling back and forth along gantry 44.

Carriage 16 includes a substantially planar, generally rectangularly shaped bed portion 66 having a reinforced outer perimeter for enhanced structure integrity. Openings 68, 70, and 72 are formed in bed 66 to reduce its weight while retaining the structural integrity of the bed. The carriage rollers 64 are attached to the corners of the bed 66 by stub axles 74 which engage within through-bores formed in bosses 76 which extend transversely from each of the four corners of the carriage bed 66. Antifriction bearings (not shown) are utilized between the rollers 64 and the stub axles 74 to enhance the free rolling of carriage 16 along gantry 44.

Carriage 16 is powered to move back and forth along gantry 44 by motive system 20. In this regard, a timing belt 80 extends around a driven pulley 82 located at the lower end of drive shaft assembly 173b of motive system 20 and also around an idler pulley 84 of an idler assembly 86 mounted on the upper end of bracket 46 by upper and lower bracket ears 87 and 88. As such, the belt 80 makes a loop around the gantry 44, extending closely along the sidewalls of the beam. The idler pulley 84 is adapted to rotate freely about central shaft 88A of the idler assembly 86 through the use of an antifriction bearing (not shown) with the upper and lower ends of the shaft being retained by bracket ears 87 and 88.

The ends of belt 80 are connected to the backside of carriage bed 66. As most clearly shown in FIGS. 2 and 3A, clips 89 are clamped to the ends of belt 80 for use in attaching the ends of the belt to the carriage 16 in a quick release manner. Each of the clips 89 includes a clamping face 90 for attachment to an end of the belt 80. The clips 89 also include an elongated slot portion 91 for engagement over a pin 92 anchored to carriage 16 and anchor pin 93 extending transversely from a slide block 94 keyed within a longitudinal, horizontal slot 95 extending along a carriage bed 66. A threaded pin 96 extends outwardly of a slide block 94 in a direction substantially perpendicular to pin 93 to engage within a threaded hole formed in the perimeter of carriage bed 66 to extend outwardly of the carriage bed. The tension of belt 80 is adjusted by rotation of pin 96.

Figure 3B:
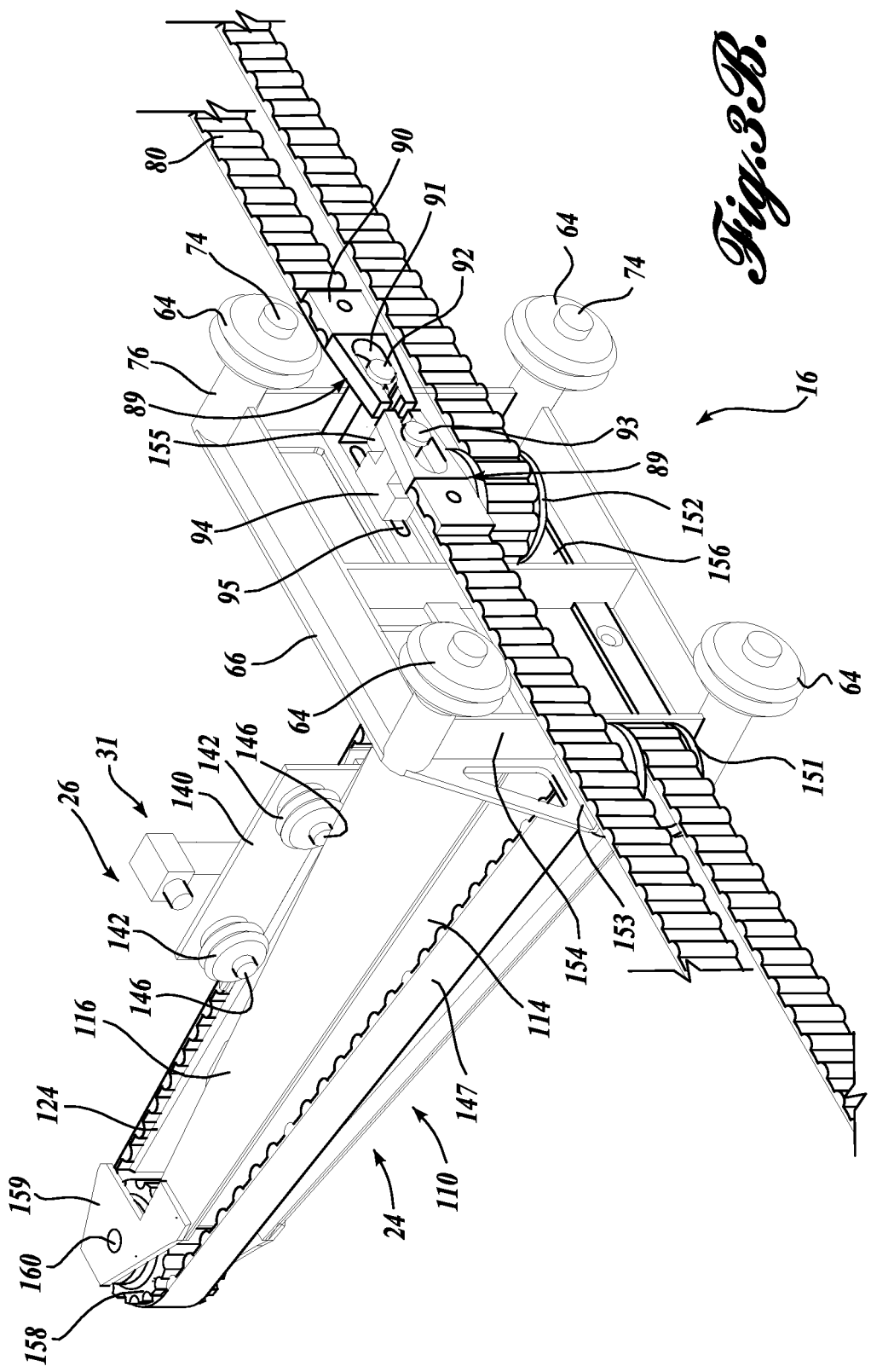
FIG. 3B is an isometric view taken from the opposite side of FIG. 3A.

As shown in FIG. 3B, the ends of clips 89 are not closed, but rather the slot portion 91 is open, with the opening being of a width somewhat narrower than the diameter of anchor pins 92 and 93. It will be appreciated that if carriage 16 is ever in a "runaway" condition or if motive system 20 malfunctions, tending to cause the carriage to overrun gantry 44, the belt 80 can detach from the carriage 16 by separation of either or both ends of clip 89 to cause the clip(s) to longitudinally slide off of the anchor pin 92/93. As such, potential damage to cutter apparatus 18 may be avoided or at least minimized.

Referring to FIG. 2, the motive system 20 includes a servo motor 97 programmable to control the movement of the carriage 16 back and forth along gantry 44 as desired. The servo motor is located at a location substantially insulated from moisture or other contaminants that may be associated with the work being carried out on the work products. A hollow drive shaft (not shown) extends up through drive shaft assembly 173b. The driven pulley 82 is attached to the lower end of the hollow drive shaft and a drive pulley 98 is attached to the upper end of the hollow drive shaft. The drive pulley 98 is connected by belt 94 to an output drive pulley (not visible) powered by motor 97. It will be appreciated that by the foregoing construction, the servo motor 97 is located remotely from the carriage 16, with the driving force applied to the carriage 16 by the lightweight timing belt 80.

Although ideally motive system 20 utilizes a servo motor, other types of electrical, hydraulic, or air motors may be employed without departing from the spirit or scope of the present invention. Such motors are standard articles of commerce.

By the foregoing construction, motive system 20 is capable of quickly accelerating and decelerating carriage 16 for movement along gantry 44. To assist in the deceleration of the carriage 16, shock absorbers 102 are mounted at each end of gantry 44 by brackets 103 and 104 extending outwardly from the beam. Ideally, but not essentially, the brackets 103 and 104 may be integrally constructed with brackets 46 and 48, respectively. The shock absorbers 102 include a plunger 105 directed at the end edges of carriage bed 66. Although not shown, a piston is attached to the plunger 105 within the interior of the shock absorber cylinder which is filled with a fluid to resist the retraction of the plunger 105 in a manner similar to a "standard" hydraulic shock absorber. Also, the shock absorber 102 includes an interior compression spring (not shown) that nominally extends the plunger 105 longitudinally outwardly from the shock absorber cylinder. As such, if the carriage bed 66 strikes against one of the plungers 105, the plunger retracts somewhat when bringing the carriage 16 to a stop.

Referring to FIGS. 2 and 3A in cutter apparatus 19, an elongated track 122 is mounted on and extends longitudinally on beam sidewall 112. Track 122 includes formed upper and lower edge portions 124 and 126 that are spaced away from sidewall 112 to define upper and lower rails for guiding the longitudinal carriage 26. The track 122 is attached to beam sidewall 112 by a plurality of hardware members 128 and extends through clearance holes formed in the track and through spacers (not shown) fixedly mounted to sidewall 112 at the back side of the track to engage the beam 24. Also to minimize the weight of track 122, cut-out oval openings 136 are formed in the track.

The longitudinal carriage 26 is adapted to travel along track 122. In this regard, the carriage 26 includes a substantially planar, rectangular-shaped bed portion 140 and a pair of upper rollers 142 and a pair of comparable lower rollers (not shown) having concave outer perimeter portions sized to closely engage with the corresponding crowned track 122, having upper and lower rail edge portions 124 and 126. The upper and lower rollers are mounted on stub shafts extending transversely from the carriage bed 140. Ideally, but not shown, antifriction bearings are utilized between the stub shafts and the rollers to enhance the free movement of the carriage 26 along track 122.

Carriage 26 is moved back and forth along track 122 by the second motive system 28, constructed similarly to motive system 20, to power a lower timing belt 147. The timing belt 147 is trained around a driven pulley 148 of motive system 20. The portion of drive train 22 connecting the timing belt 147 to motive system 20 is described more fully below with respect to FIGS. 9 and 10, and also trained around an idler pulley 149 located below idler pulley 84 on the idler assembly 86 which is secured to the end of gantry 44 opposite the motive system 28. As such, the belt 147 also extends along the opposite sidewalls of gantry 44, but at an elevation spaced below belt 80.

An idler pulley 158 is mounted on the free end of gantry 44 by a formed bracket 159 which is fixedly attached to the beam 24. An inlet shaft 160 extends through the center of an antifriction bearing mounted within pulley 158, with the ends of the shaft retained by the upper and lower ears of bracket 159.

The ends of belt 147 are attached to the bed 140 of carriage 26. To this end, one end of belt 147 is clamped to the carriage bed by hardware members 162 that extend through close-fitting clearance holes formed in a clamping plate 163 to clamp the end of the belt to an underlying clamping plate 164 mounted on the outer face of carriage bed 140. The opposite end of belt 147 is clamped to a slide bar 166 which is sized to slide within a horizontal slot 168 formed in the carriage bed 140. A tab 170 extends generally transversely from the end of slide bar 166, and a threaded lock pin 172 in turn extends transversely from the tab to engage within a threaded hole formed in a flange 173 extending transversely from the adjacent end of carriage bed 140. The tension of belt 147 is adjusted by rotation of lock pin 172.

Rotation of driven pulley 148 results in movement of the belt 147, which in turn causes the transverse carriage 26 to move along track 122. In this regard, the motive system 20 includes a servo motor 173a which is drivingly connected with driven pulley 148 by a drive shaft 173b that extends downwardly through a drive shaft assembly. A drive pulley 173c is attached to the upper end of drive shaft 173b, which pulley is connected via timing belt 173d to a drive pulley (not visible) powered by motor 173a. The drive shaft 173b is disposed within the hollow drive shaft extending between pulleys 82 and 98.

As with motor 97, other types of well-known and commercially available rotational actuators may be utilized in place of servo motor 173a. Also, it will be appreciated that motive system 20 is located remotely from not only transverse carriage 16, but also longitudinal carriage 26. As a result, the mass of the motive system 20 is not carried by either of the two carriages; rather, the motive system is positioned at a stationary location, with the drive force being transferred from motive system 20 to carriage 26 by a lightweight timing belt 147. As a consequence, the total mass of the moving portions of apparatus 10 (carriage 16, support beam 24, and carriage 26) is kept to a minimum. This allows extremely high speed movement of the two carriages, with accelerations exceeding eight gravities.

Cutting System

A work tool 31 depicted as composed of a line cutter in the form of a high-pressure liquid nozzle assembly is mounted on the longitudinal carriage 26 to move therewith. The nozzle assembly emits a very focused stream of high-pressure water disposed in a vertical cutting line that may be transverse to the plane of conveyor belt 36. The nozzle assembly includes a body portion 174 that is secured to the carriage bed 140 by a pair of vertically spaced apart brackets 176. The nozzle assembly includes a lower outlet nozzle 177 directed downwardly toward conveyor belt 36. An entrance elbow 178 is attached to the upper end of nozzle body 174. High-pressure liquid nozzles of the type embodied by work tool 31 are well-known articles of commerce.

Water jet cutters 19 with two axes of movement, as described above, can cut intricate two-dimensional patterns in workpieces 13 being conveyed by conveyor belt 36. As the vision system 200 monitors the location, reflectance and thickness, and other physical parameters and features of the workpieces 13 passing under it, the computer 220 processes the vision data and determines servo-motor cut paths to execute the computer program instructions in light of the specific workpieces passing through. The water jet emitted from nozzle 177 of tool 31 can be stopped/deflected very quickly at precise times. Up to eight cutters on independent 2-axis paths can be provided per machine 10. The water jets can cut most food products up to about four inches thick. The conveyor belt 36 moves continuously, with one of the axes of the cutters typically being in the direction of belt travel (for a limited distance).

Figure 4:
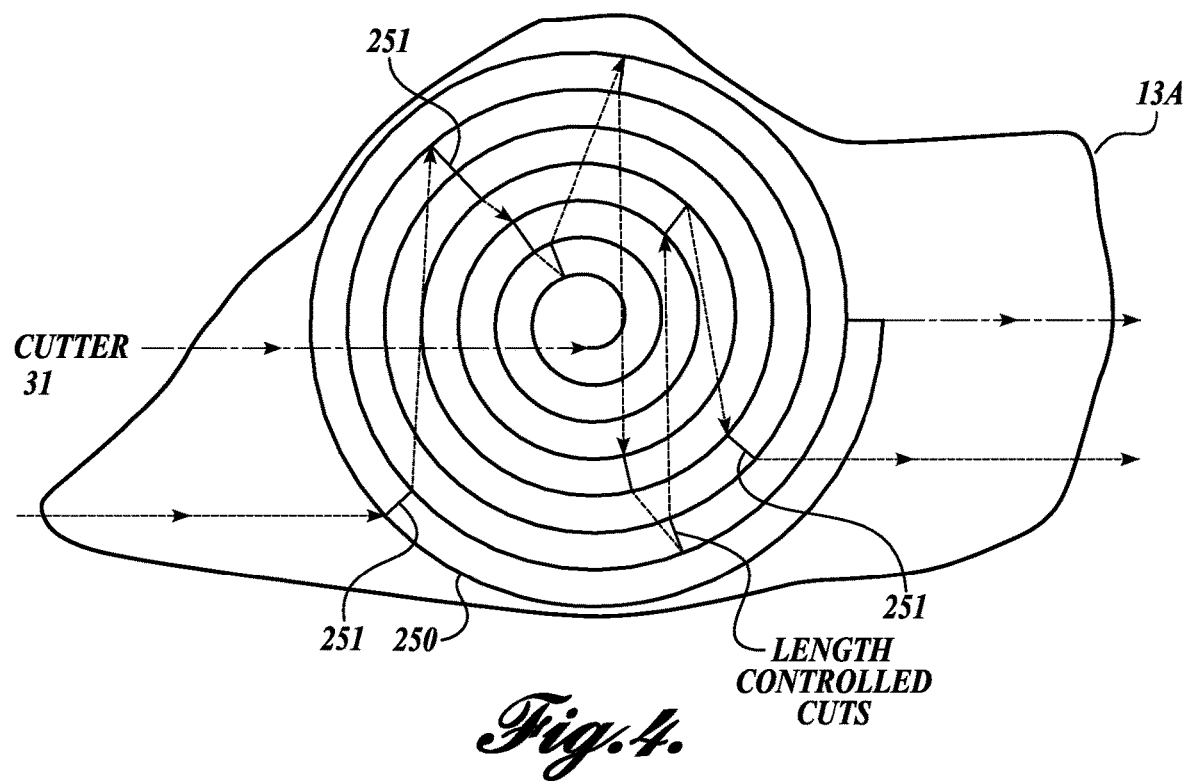
FIG. 4 shows a spiral cutting pattern for cutting a continuous slice from a workpiece.
Figure 5:
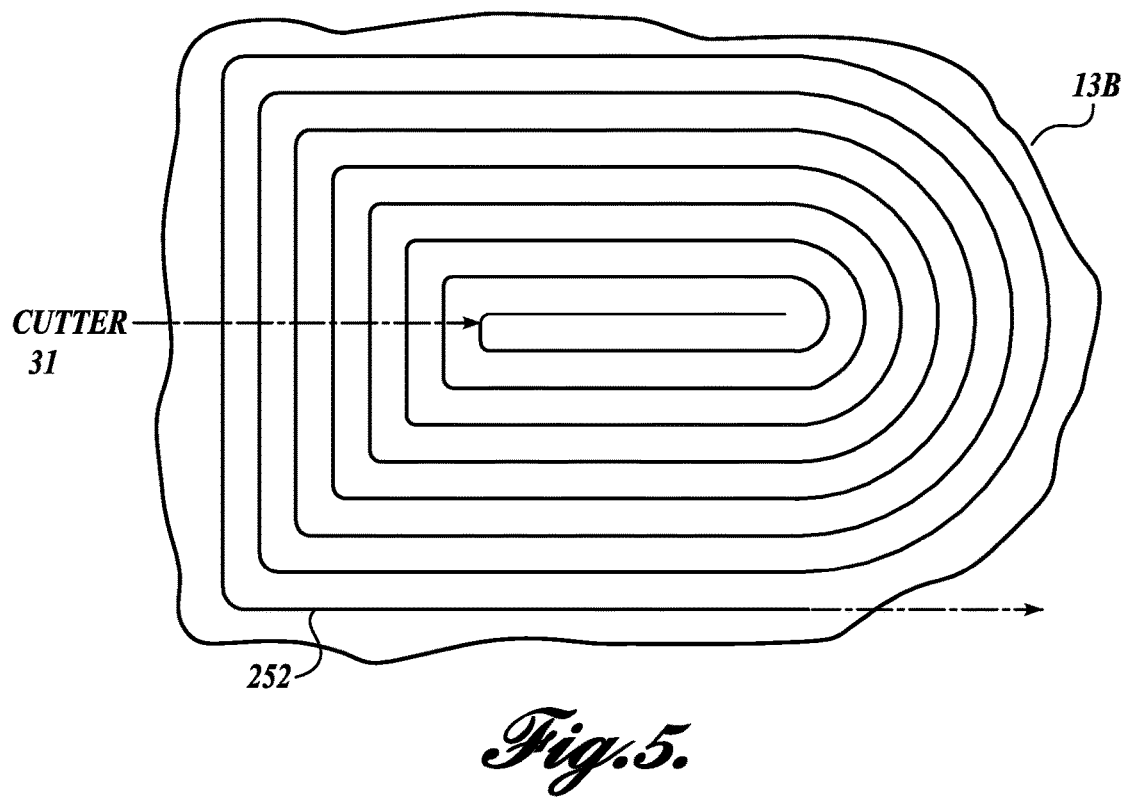
FIG. 5 shows a further slicing pattern for cutting a continuous slice from a workpiece.

At least two general types of patterns can be used to cut long strips from shorter pieces 13. A first general pattern type is a spiral cut of a circular pattern 250, as shown in FIG. 4, by either starting in the middle of the workpiece 13A and working out, or starting at the outside of the workpiece 13A and gradually working toward the middle. A spiral cut pattern can be used with almost any shape of workpiece. The spiral cut pattern need not be a circular spiral. The spiraling pattern can be of numerous other shapes, such as generally triangular, rectangular, rectilinear, oval, a combination of these patterns, and even high aspect ratio shapes. FIG. 5 shows a spiral cut pattern 252 where part of the pattern 252 is rectangular or rectilinear, and another part of the pattern 252 is generally semi-circular in shape, thereby to correspond with the overall shape of the workpiece 13B.

Figure 6:
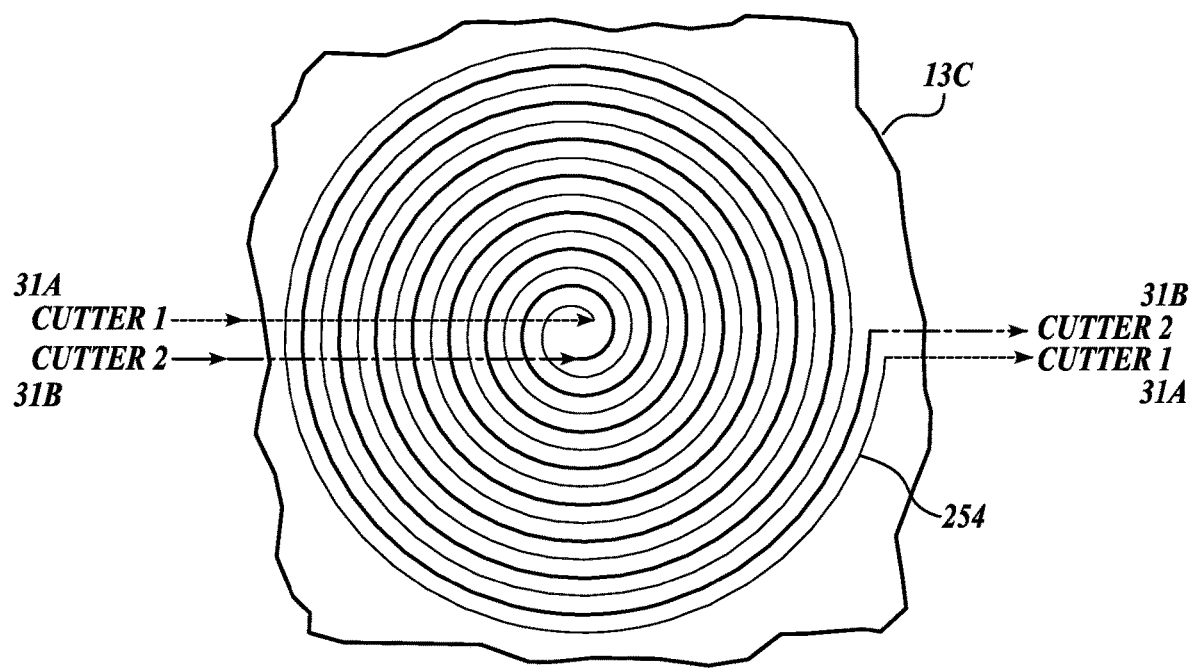
FIG. 6 shows a cutting pattern using two cutters for cutting a continuous strip in a spiral pattern in a workpiece.

A variation of spiral cutting patterns is to use a double or triple lead (or more) spiral, with each lead formed by a separate cutter. An illustration of this variation is shown in FIG. 6, wherein cutters 31A and 31B are used to cut a double lead circular spiral pattern 254. This enables the slicing to be performed at a faster rate, since by using two cutters 31A and 31B, only half the number of revolutions need be cut with each cutter. Also, as will be appreciated, depending on how the beginning and ends of the cuts of the multiple leads 31A and 31B are connected, this cutting strategy can result in either multiple strips or one long strip. If multiple strips are cut, the strips can be spliced together using a food grade adhesive, thereby resulting in a singular strip.

Figure 7:
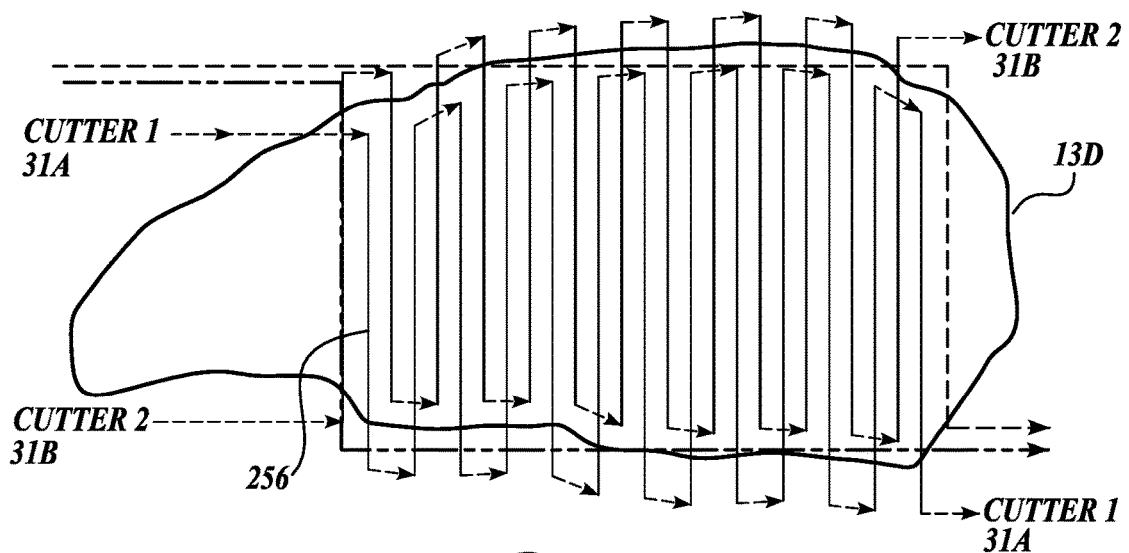
FIG. 7 illustrates an alternating back and forth cutting pattern using two cutters to cut a continuous strip from a workpiece.

A further type of general cutting strategy is to utilize a "back and forth" pattern along the length of or across a workpiece, where the cuts do not go all the way to the opposite ends or sides of the workpiece. An example of cutting a workpiece utilizing alternating "back and forth" cuts is shown in FIG. 7. In FIG. 7, two cutters 31A and 31B are utilized in a double lead cutting pattern 256. As shown in FIG. 7, the workpiece 13D is cut in a single continuous strip utilizing cutters 31A and 31B. The cutters 31A and 31B may be disabled at the ends of the cut line, which is represented by a broken line in the cutting patterns. The cutters 31A and 31B can be precisely controlled to disable the cutters very quickly and also to enable the cutters very quickly. If the cutters 31A and 31B are water jet cutters, the control of such cutters can be carried out by jet blockers that include a blocking member that can be moved in position to block the water jet and then moved out of position to enable the high speed water jet to resume cutting of the work piece. Jet blockers suitable for use with cutters 31A and 31B are disclosed in U.S. Pat. Nos. 5,931,178 and 5,927,320, incorporated by reference herein.

Although such alternating (back and forth) cutting likely is easiest to achieve using straight cuts in a rectangular or rectilinear shape, such cuts can be made in other shapes and also curved so as to take advantage of the overall shape of the workpiece or to avoid a bone, fat, rind, a hole, or other deformity or undesirable feature in the workpiece. Whether the alternating cut pattern is in a straight line or curved, there may be some trim along the edges or other margins of the workpiece.

After the cuts are made by cutters 31A and 31B, as shown in FIG. 7, a secondary flattening process can be utilized to smooth out the sharp corner cuts. This may assist in being able to wind the continuous strip into a continuous "well-behaved" roll. The secondary flattening process can be performed utilizing various types of equipment, such as roller pairs, between which the cut strip is continuously fed.

As shown in FIG. 4, crosscuts or nicks 251 are formed or cut across the edge of the slice of the food product. The cuts or nicks 251 can be made in increments along the length of the strip formed from the work product 13A. Such cut or nick can be made at an incremental desired length, for example, 4 inches or 12 inches, to aid in dispensing for desired specific lengths of the sliced product. For example, if it is desired to have each strip of a specific length to fit within a bun of a specific configuration, rather than guessing or having to measure along the formed strip, lengths can be cut from the strip at each nick or crosscut, thereby resulting in precise lengths of the product strip.

Alternatively, the position of the cut or nick 251 can be based on an incremental weight of the food product along the strip. The system 10 can monitor the variation and thickness of the strip that is cut and then place a nick at a location along the strip corresponding to a desired portion weight. Through this technique, uniform serving sizes can be achieved. The cut or nick 251 can be made by the same cutter 31 used to cut the spiral strip or could be made by a second cutter, not shown, which is dedicated to making the nicks or crosscuts 251.

FIGS. 4 and 5 show cutting patterns 250 and 252 created with a single cutter 31. The cutting patterns shown in FIGS. 6 and 7 utilize dual cutters 31A and 31B to make the continuous cut patterns 254 and 256 illustrated in these figures. It is possible to use additional cutters to achieve the same cutting patterns 250, 252, 254, and 256. For example, the cutters 31 or 31A/31B shown in the figures above can be utilized to cut part of the illustrated patterns, and then a second cutter or cutter set can be utilized to finish the slicing/cutting of the workpieces. As can be appreciated, this can result in higher throughput of product. Also, it is possible to use a single cutter in place of dual cutters 31A and 31B, which, of course, will result in the cutting to be completed in double the time of using dual cutters.

In the overall slicing process of the present disclosure, work products 13 are inspected by the vision systems 20 before making slicing decisions. Such inspections not only are used to determine the size, shape, length, width, and thickness of the workpiece, but also seek out defects such as fat, fat content, rind, bone, and voids, so that appropriate slicing decisions can be made to avoid such defects. The local fat content of the workpiece can be determined by utilizing a dual energy X-ray system instead of or in addition to the vision system 20 described above. Moreover, X-ray scanners are able to accurately locate bone in workpieces.

Based on the results of the inspection step, the computer 220 determines an optimal slicing strategy for the workpiece, whether or not a circular or other shaped spiral pattern is to be utilized or a "back and forth" cutting pattern is to be employed. Thereafter, the computer 220 is utilized to control the motion of the cutters so as to slice the workpiece into the desired or determined slicing pattern. In this regard, one or more optimizer algorithms can be utilized to take into account many factors, such as enlarging the pattern to the limits of the work product, adjusting the pattern to "work around" defects, deciding how many patterns to cut in a particular product, as well as where to place the pattern or patterns on the work product. Also, optimizer algorithms can be utilized to compensate for variations in the product thickness by varying the width of the slices so that the product achieves an equal weight per unit length of the strip cut from the workpiece.

Further Embodiment

Figure 8:
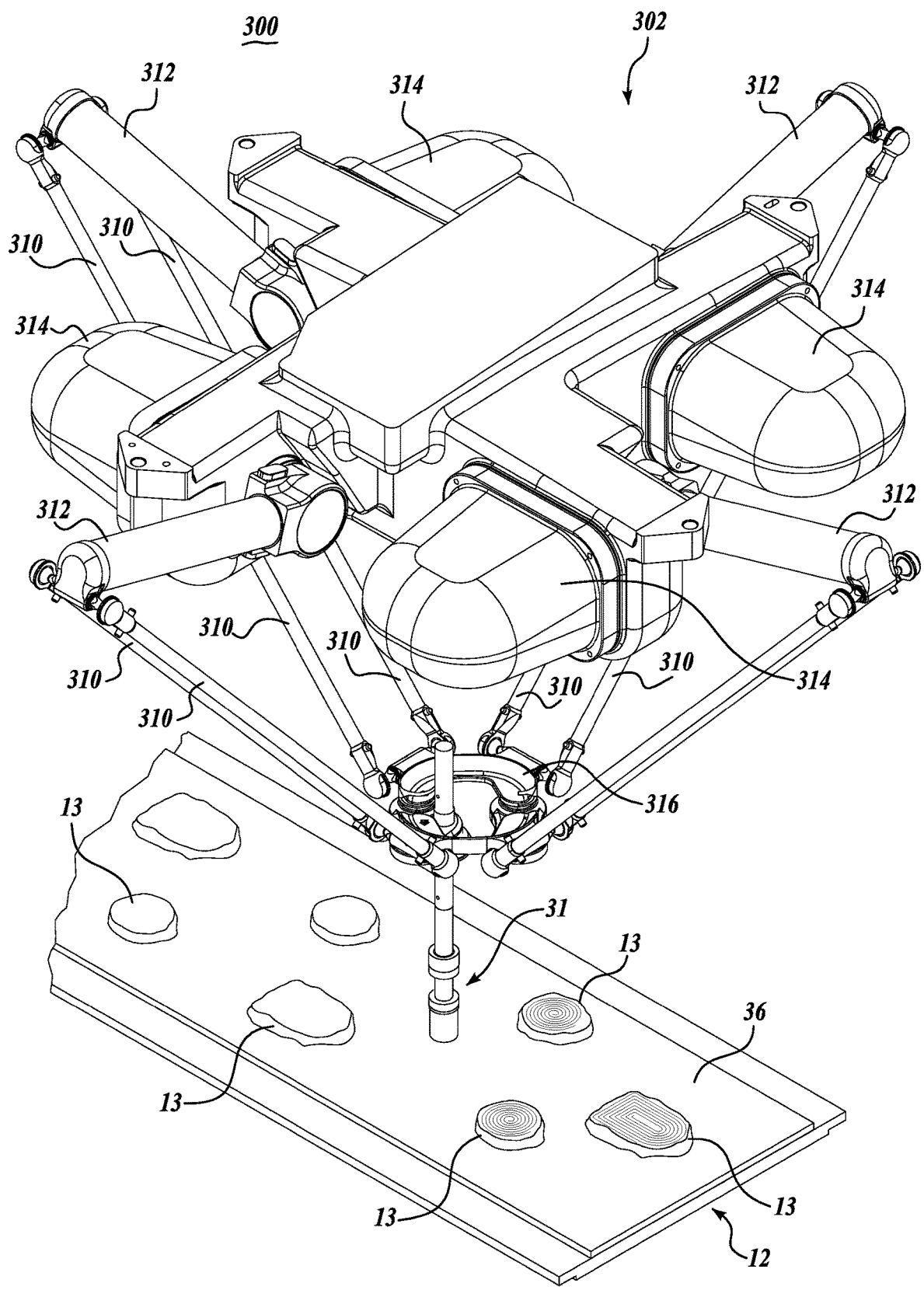
FIG. 8 is a further embodiment of the present disclosure.
Figure 9:
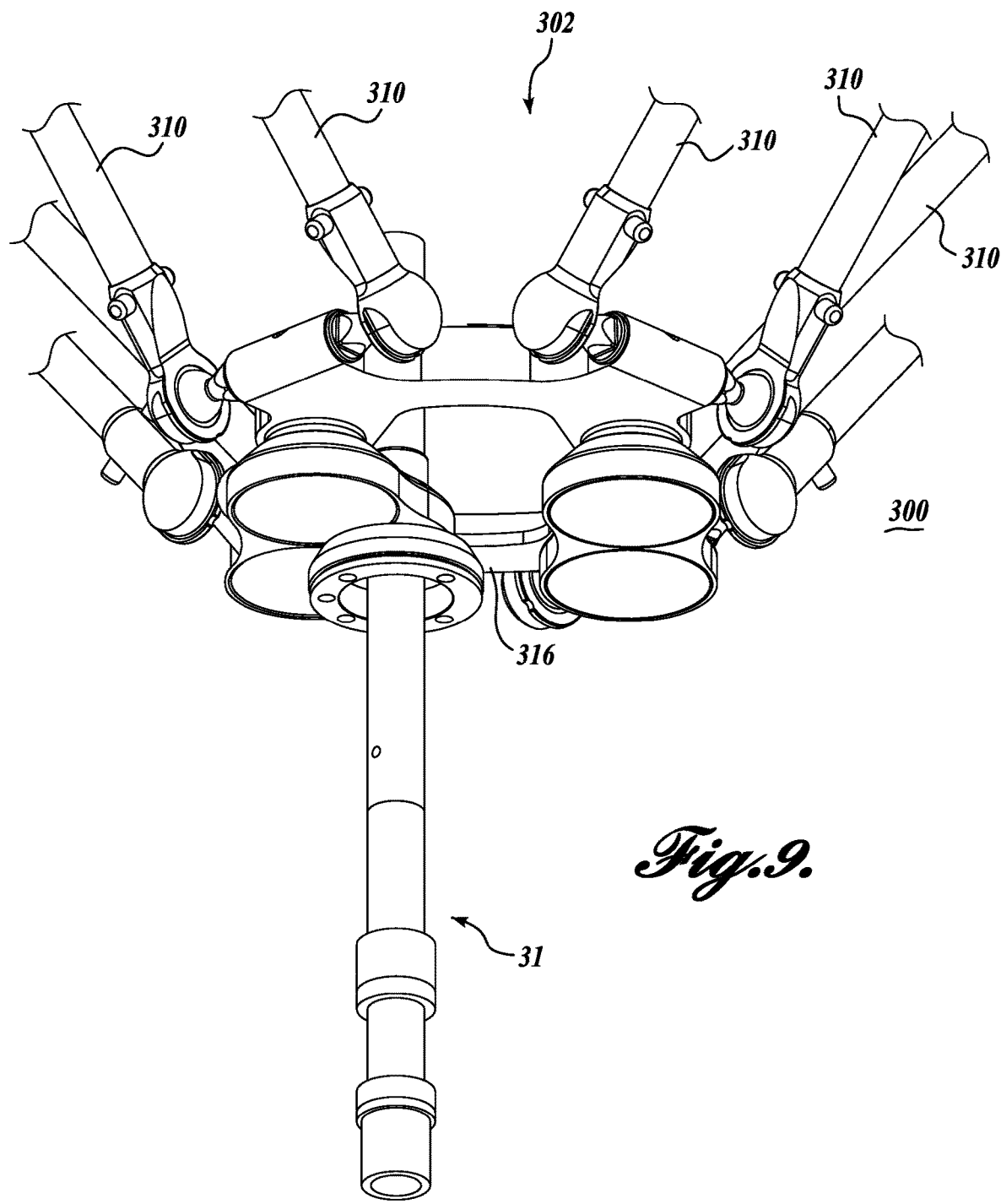
FIG. 9 is a fragmentary pictorial view of a portion of FIG. 8.

Next, referring to FIGS. 8 and 9, a further embodiment of the present disclosure includes a system 300 for slicing work products 13 into one or more continuous strips. As shown in FIGS. 8 and 9, system 300 is composed of a carrier system in the form of a robotic structure 302. The structure 302 is composed of four sets of powered arm pairs 310 that are connected to each other at one end (upper end) to a powered pivot arm 312, which in turn is connected to a rotary actuator 314 that is powered to rotate about a horizontal axis. Each of the four pivot arms 312 extend outwardly from a central axis in a quadrant arrangement. The lower or opposite ends of the arm pairs 310 are connected to a carrier head or ring 316 to which a cutter tool 31 is mounted.

The carrier system is capable of moving the carrier head 316, and thus the cutter assembly in any direction over the conveyor 12, including side to side, longitudinally, up and down, as well as diagonally. The carrier system is also capable of tilting the cutter assembly 31 away from vertical into a desired orientation. As such, the cutter assembly 31 is capable of cutting the work products 13 in a desired manner, in continuous slicing patterns. Although a singular carrier system is shown in FIGS. 8 and 9, multiple carrier systems can be utilized in system 300.

The cutter system 300 shown in FIGS. 8 and 9 can be utilized to make angled cuts by tilting the cutter 31 during use, for instance, making the spiral cut shown in FIG. 4. This enables the resulting slices to be wider than the thickness of the workpiece being cut. For example, bacon slices can be cut at an angle to the cured pork belly to result in the slices being wider than the thickness of the pork belly.

While illustrative embodiments have been illustrated and described, it will be appreciated that various changes can be made therein without departing from the spirit and scope of the invention.

For example, while various carrier systems have been described above, other carrier systems may be utilized. Also, the carrier systems may be composed of other types of robotic apparatuses described above.

Also, although a water jet line cutter has been described and illustrated for use with the system and methods of the present disclosure, other types of non-directional line cutting devices can be utilized, for example, appropriate types of lasers or nozzles emitting a fluid other than water.

The invention claimed is:

1. A system for cutting continuous, elongate strips from a food product, the elongate cut strips being of a length longer than the length of the original food product with sections of the strips cut from the food product disposed alongside other sections of the same continuous strip being cut, comprising:
    (a) a conveyance system for conveying a food product;
    (b) a scanning system, with at least one scanner selected from an optical scanner and x-ray scanner, for scanning the food product and generating information regarding the physical features of the food product;
    (c) a cutting system for cutting the food product into one or more continuous elongated strips, the cutting system comprising a line cutter;
    (d) a carrier system for moving the line cutter relative to the conveyance system along one or more two-dimensional cutting path patterns to cut the food product into one or more elongated strips;
    (e) a processor-enabled control system to:
        (i) process the scanning information to determine physical parameters of the food product, including its size, shape, two-dimensional profile, and location on the conveyance system;
        (ii) determine two-dimensional cutting path patterns for the line cutter for cutting the food product to cut one or more continuous elongated strips between the cutting paths of the line cutter, said elongated strips being of a length longer that the length of the original food product based on the two-dimensional profile of the food product; and
        (iii) direct the carrier system and cutting system to cut the food product with the line cutter along the one or more two-dimensional cutting path patterns to cut one or more elongated strips between the cutting paths of the line cutter, the elongated strips being cut in a length longer than the length of the original food product with sections of the strips cut from the food product disposed alongside other sections of the same continuous strip being cut, and
    (f) wherein the control system performs one or more of the following functions: (i) determines the shape of the cutting path pattern to correspond to the overall two-dimensional shape of the food product; (ii) determines how many cutting path patterns to cut from a food product; (iii) determines where to place the cutting path patterns on the food product; (iv) adjusts the cutting path pattern to compensate for defects in the food product; and (v) adjusts the cutting path pattern to compensate for variations in the thickness of the food product.

2. The system according to claim 1, wherein the control system determines a continuous two dimensional cutting path pattern for the line cutter and then controls the cutting system and carrier system to cut the food product along the determined continuous two dimensional cutting path pattern, thereby to cut the food product into one or more continuous strips.

3. The system according to claim 1, where the pattern of the cutting path is selected from a group consisting of a spiral pattern, a serpentine pattern, and a continuous back and forth pattern so as to cut a continuous strip from the food product that is spiral, serpentine, or continuous back-and-forth in shape.

4. The system according to claim 3, wherein the shape of the spiral cutting path pattern is selected from the group consisting of round, square, rectangular, rectilinear, oval, elliptical, and a combination of two or more of the foregoing shapes.

5. The system according to claim 4, wherein the shape of the spiral cutting path pattern corresponds to the overall two-dimensional shape of the food product.

6. The system according to claim 1, wherein the cutting system comprises two or more line cutters operated in tandem to cut the food product along a multiple lead cutting path.

7. The system according to claim 1, wherein the cutting system comprises two or more line cutters, the two or more line cutters cutting a portion of the continuous cutting path pattern in the food product under the control of the processor enabled control system.

8. The system according to claim 7, wherein the two or more line cutters sequentially cut portions of the continuous cutting path pattern.

9. The system according to claim 1, wherein the control system controls the line cutter(s) to produce crosscuts in the edge of the strip cut from the food product.

10. The system according to claim 9, wherein the cross-cuts are made at either incremental fixed distances along the length of the cut strip or at incremental distances along the length of the cut strip based on a desired weight of the cut strip between adjacent crosscuts.

11. The system according to claim 1, wherein the carrier system moves the line cutter at a tilted angle relative to the conveyance system to cut the food product at such tilted angle.

12. The system according to claim 1, further comprising a flattener to flatten the continuous strip(s) cut from the food product.

13. A method of cutting a food product into one or more continuous elongated strips from a food product, the elongated strips being longer than the original food product with sections of the strips cut from the food product disposed alongside the other sections with the same continuous strip being cut, comprising:
    scanning the food product by a method selected from the group consisting of optical scanning and x-ray scanning, to determine physical parameters of the food product, including the size, shape, and two-dimensional profile of the food product;
    determining, based on the two-dimensional profile of the food product, a two-dimensional cutting path pattern for the food product to cut one or more continuous elongated strips between the cutting paths of the line cutter, the continuous strips being of a length longer than the length of the food product;
    in determining the cutting path pattern performing one of more of the following steps: (i) determining the shape of the cutting path pattern based on the overall two-dimensional shape of the food product; (ii) determining how many cutting path patterns to cut from a food product; (iii) determining where to place the cutting path patterns on the food product; (iv) adjusting the cutting path pattern to compensate for defects in the food product; and (v) adjusting the cutting path pattern to compensate for variations in the thickness of the food product, and operating a line cutter to cut the food product in the pre-determined two-dimensional cutting path pattern to cut one or more continuous elongated strips from the food product between the cutting paths of the line cutter, the continuous strips being of a length longer than the length of the original food product, with portions of the strips cut from the food product disposed alongside of other sections with the same continuous strip being cut.

14. The method according to claim 13, further comprising conveying the food product during the scanning of the food product and the cutting of the food product into one or more continuous strips.

15. The method according to claim 13, wherein the pattern of the cutting path into which the food product is cut is selected from a group consisting of a spiral pattern, a serpentine pattern, and a continuous back and forth pattern so as to cut a continuous strip from the food product that is spiral, serpentine or continuous back-and-forth in shape.

16. The method according to claim 15, wherein the shape of the two dimensional spiral cutting path pattern is selected from the group consisting of round, square, rectangular, rectilinear, oval, elliptical, and a combination of two or more of the foregoing shapes.

17. The method according to claim 15, wherein the shape of the spiral cutting path pattern corresponds to the overall shape of the food product.

18. The method according to claim 13, wherein two or more line cutters are operated in tandem to cut the food product along a multiple lead path.

19. The method according to claim 13, wherein two or more line cutters are utilized to each cut a portion of a continuous cutting path in the food product.

20. The method according to claim 19, wherein the two or more line cutters sequentially cut a portion of the continuous cutting path.

21. The method according to claim 13, further comprising making sequential crosscuts in the edge of the strip cut from the food product.

22. The method according to claim 21, wherein the crosscuts are made at either an incremental fixed distance along the length of the cut strip or at incremental distances along the length of the cut strip based on a desired weight of the cut strip between adjacent crosscuts.

23. The method according to claim 13, wherein the line cutter is tilted at an angle from vertical while cutting a continuous strip from the food product.

24. The method according to claim 13, further comprising flattening the one or more continuous strips cut from the food product.

* * * * *